Aug. 7, 1934.    A. E. IRONS ET AL    1,969,134
FIRE PREVENTIVE ATTACHMENT FOR MOTION PICTURE PROJECTION MACHINES
Filed March 30, 1931    3 Sheets-Sheet 1

A. E. Irons &
D. S. Kepler
INVENTORS

BY
ATTORNEYS.

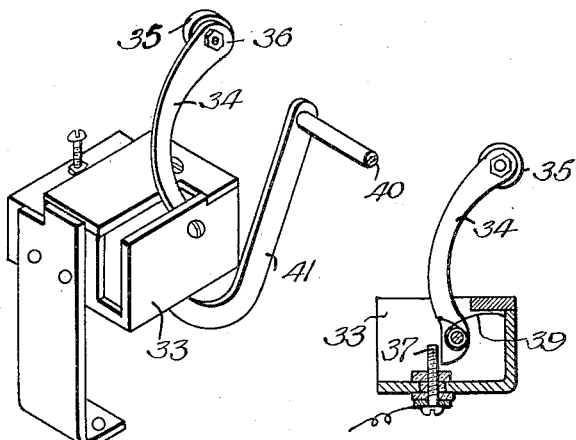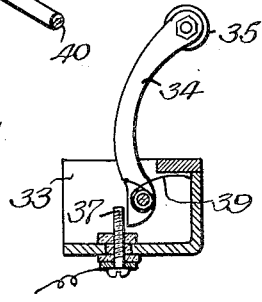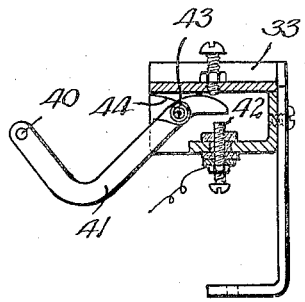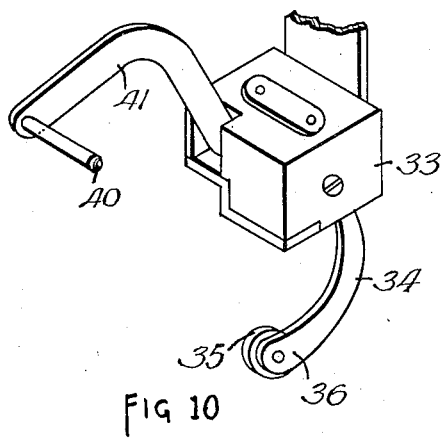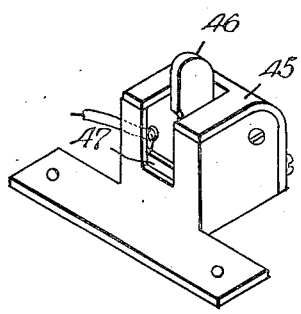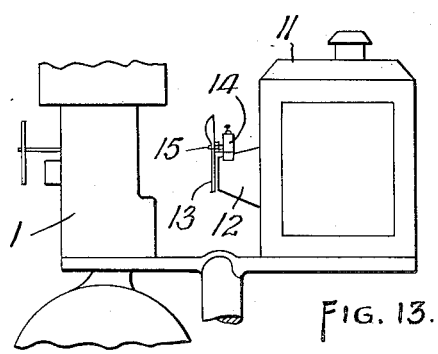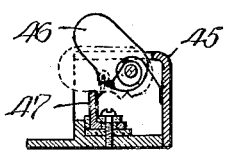

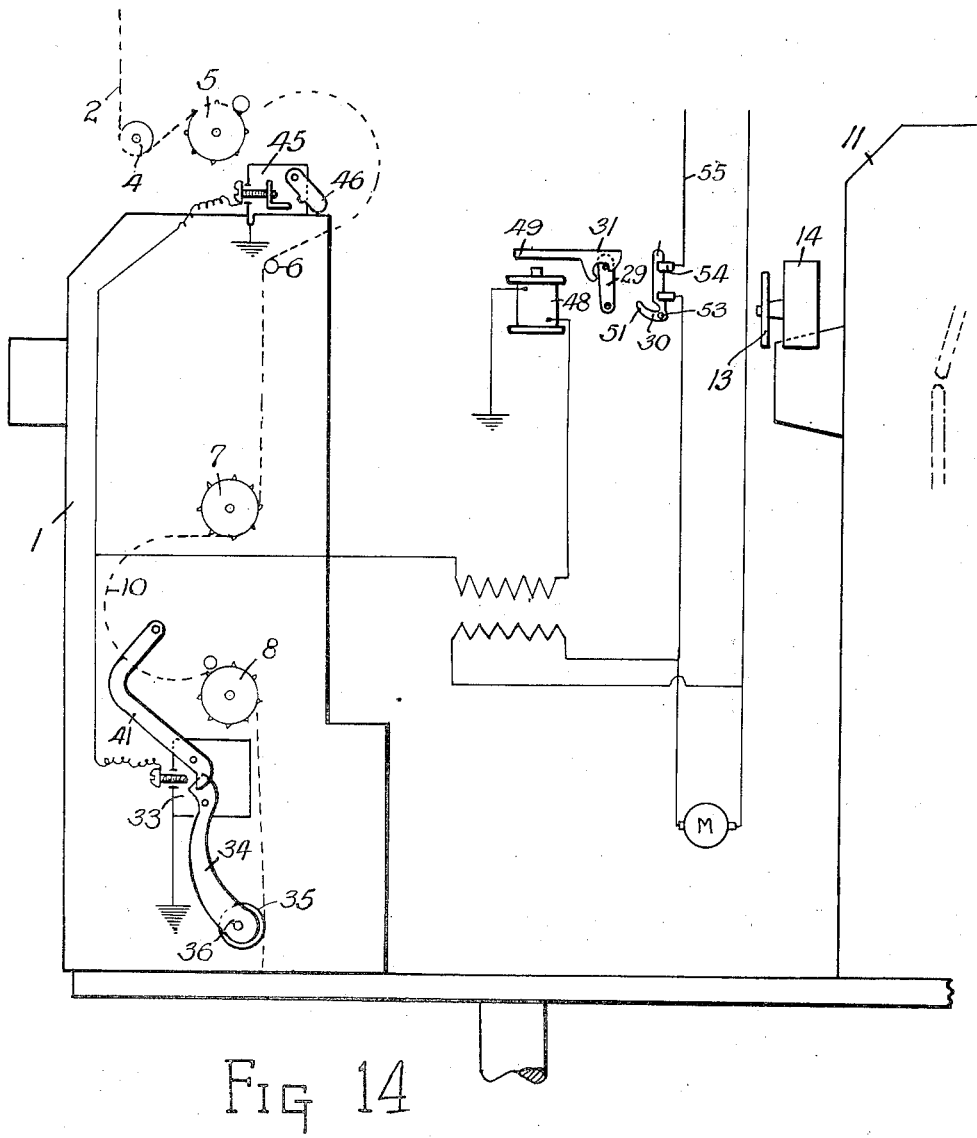

Patented Aug. 7, 1934

1,969,134

UNITED STATES PATENT OFFICE 1,969,134

FIRE PREVENTIVE ATTACHMENT FOR MOTION PICTURE PROJECTION MACHINES

Archie E. Irons and Darrell S. Kepler, Sharon, Pa.

Application March 30, 1931, Serial No. 526,310

1 Claim. (Cl. 88—17)

This invention relates to attachments for motion picture projection machines.

The principal object of this invention is to provide means for preventing film fires when accidental interference with the proper operation of the film in a projector occurs.

A further object of this invention is to provide a complete automatic safety system by providing a simple arrangement of a device that may easily be attached to any projection machine, whereby the light rays from an arc lamp will be instantly cut off from the film and an electric supply utilized to energize a driving motor will be instantly cut off at any time that the film in the projector mechanism fails to function in a proper and ordinary manner. The object of cutting off the light rays from the arc lamp as above stated is to prevent hot light rays from an arc light from igniting the film at the light aperture. At such times as the film does not act in a proper manner the reason for this may be due to the film running off of sprockets, improper shortening and lengthening of upper or lower film loop, film splice coming apart, or due to failure of the film take-up mechanism.

A further object is to provide manual means for shutting off light rays from the arc lamp.

A still further object of this invention is to provide manual means for disconnecting electric supply to the driving motor.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 7 is a perspective view of a film switch attachment.

Figure 8 is a detail in section of Figure 7.

Figure 9 is a detail in section of Figure 7.

Figure 10 is a perspective view of Figure 7 in a reversed position.

Figure 11 is a perspective view of a secondary film switch.

Figure 12 is a detail cross section of Figure 11.

Figure 13 is a side elevation of a portion of a projection machine showing the device attached thereto.

Figure 14 is a diagrammatic view showing connections between the plurality of switches and the electromagnet.

Figures 1, 2:
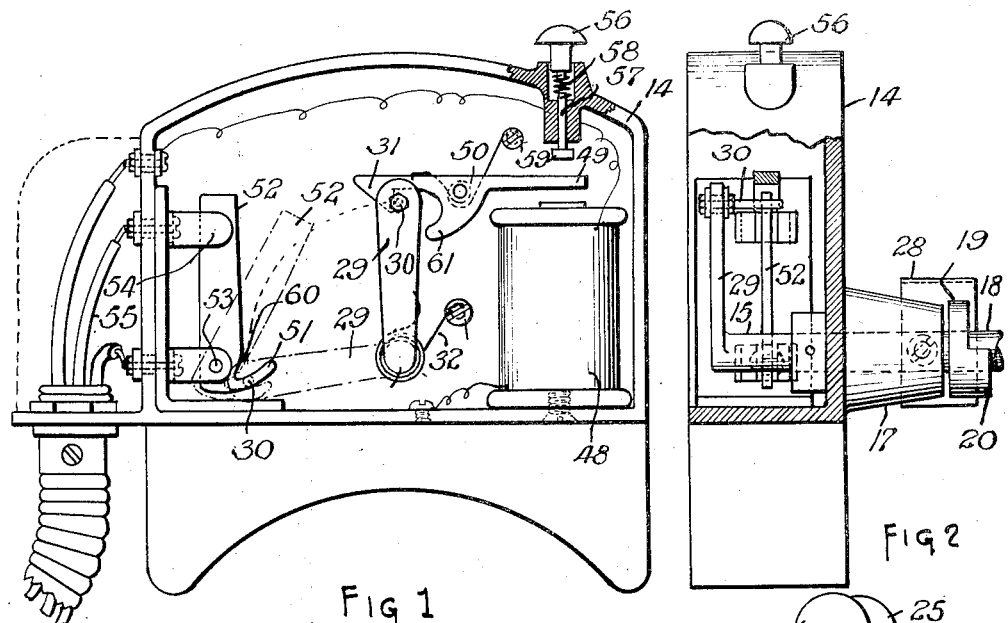
Figure 1 is a rear elevation of a principal attachment of the device with parts broken away, set to hold a douser in an open position.
Figure 2 is a side elevation of Figure 1 with parts broken away.

By referring to Figure 14 it will be seen that there is shown an ordinary projector 1. This figure shows a film 2 traveling from an upper magazine 3 over an idler 4, a sprocket 5, an idler 6, a sprocket 7, and a sprocket 8. It will be seen that when the film is properly placed for operating there is a loop 9 formed between the sprocket 5 and the idler 6. It will also be seen that there is a second loop 10 formed between the sprocket 7 and the sprocket 8. The above describes an ordinary and common manner of threading the film in relation to the projector 1. By referring to Figure 14 it will be seen that there is shown an ordinary construction of a light housing 11 in relation to the projector 1. It is very important, in order to safe-guard the manipulation of a motion picture projection machine against fire, to make provision for preventing the film 2 from intense light rays coming from the light housing 11 when, for any reason, the film 2 in the projector 1 should momentarily stop in front of a light aperture 12 of the light housing 11. Should there be a momentary stop or pause of the film 2 the intense light rays coming from the light aperture 12 would probably cause a film fire on the film 2.

In order to automatically and manually control this situation in order that the intense light rays coming from the light aperture 12 may be closed instantly, should the film 2 fail to travel in a continuous manner through the projector 1, there is provided a douser 13 which closes this light aperture 12.

Figures 3, 4:
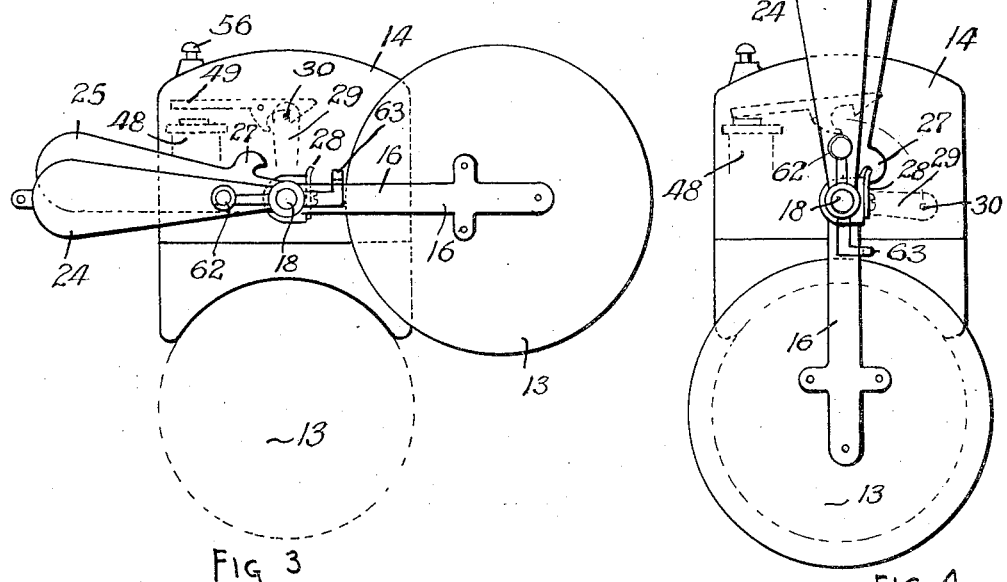
Figure 3 is a front elevation of Figure 1 showing a douser in an open position in addition.
Figure 4 is a front elevation of Figure 1 showing a douser in a closed position.
Figures 5, 6:
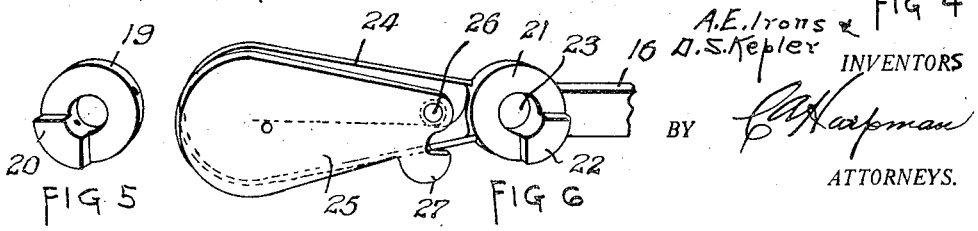
Figure 5 is a detail in perspective of Figure 2.
Figure 6 is a detail in perspective of Figure 4.

By referring to Figures 1, 3, and 4 it will be seen that the principal attachment consists of a switch box 14. This switch box 14 contains a rotatable shaft 15 provided with a douser arm 16 rotatably mounted thereon. The rotatable shaft 15 is carried by means of a boxing 17 formed on the switch box 14. An outer extended end 18 of the rotatable shaft 15 is provided with a collar 19 keyed thereon and provided with a cam 20. The douser arm 16 is provided with a collar 21 carrying a cam 22. This collar 21 is provided with a central opening 23 to slidably rotate on shaft end 18. This collar 21 functions on the outer extended end 18 of the rotatable shaft 15 beyond the collar 19 so that the cam 20 functions with the cam 22 when the shaft 15 is rotated. The douser arm 16 is provided with an extended handle member 24 which is provided with a pivoted hand grip member 25 pivoted by means of a pivot pin 26 which passes through the pivoted hand grip member 25 and the extended handle member 24. This pivoted hand grip member 25 is provided with a catch 27 which may be caused to function with a catch seat 28 when the douser is in a downwardly extended position when the same closes the light aperture. It will also be seen that this collar 21 and cam 22, being a part of the douser handle 24 and the douser arm 16, is loosely and rotatably placed on the extended shaft end 18 and is kept on the shaft end by means of a suitable collar fastened to the extreme outer end of the extended shaft 18.

By referring more especially to Figures 1 and 2 it will be seen that the switch box 14 houses a manipulating arm 29 which is an upright extension of the rotatable shaft 15. This manipulating arm 29 is provided with a latch and kick-out pin 30. The latch and kick-out pin 30 is shown in Figure 1 in a latched position against a latch 31 and held under tension by means of a spring 32 which tends to move the manipulating arm 29 in an anti-clockwise direction.

By referring to Figure 14 it will be seen that there is provided a film switch attachment 33 provided with a switch opening and closing arm 34 which is provided with a wheel 35 at its extreme end 36. When the film 2 is traveling in a normal manner the same holds a switch 37 in an open position. (See Fig. 8.)

However, should the film 2 at point 38 be released from tension, a spring 39 will instantly cause the switch 37 to be closed. Should, for any reason, the loop 10 become shortened so that the same comes in contact with a pin 40 carried by a switch manipulating arm 41, a switch 42 is closed. (See Fig. 9.) By referring to Figure 9 it will be seen that the switch manipulating arm 41 is pivoted by means of a pivot pin 43 and the switch 42 is normally held open by means of a spring 44. It will also be seen that if, for any reason, the loop 9 should be shortened the same will come in contact with another switch control 45. This switch control 45 is provided with a closing unit 46 which is under spring tension and is shown in an open position in Figure 12, showing a switch 47, and in an open position in Figure 13.

It is understood that the metallic film switch attachment 33 and the switch control 45 are electrically wired to a magnet 48 positioned within the switch box 14. Therefore, should any of the switches 37, 42, or 47 become closed, by a manner above described, the magnet 48 will instantly draw down a metallic end 49 of a pivoted latch member 50 thereby releasing the pin 30 from the latch 31, releasing the manipulating arm 29 which is held under spring tension by means of a spring 32. The manipulating arm 29 now moves swiftly in an anti-clockwise direction, the pin 30 striking a thrust cam 51 which is attached to a lower end of a switch blade 52 and pivoted at a point 53 forcing the switch blade 52 in a clockwise direction and opening a main switch 54, this main switch 54 disconnecting the main circuit 55 controlling the drive motor of the projection machine. This action not only stops the drive motor but when the manipulating arm 29 swings approximately through a quarter arc the douser arm 16 with douser 13 attachedly carried upon the rotatable shaft 15, is carried into a downward position and directly in front of the light aperture 12 cutting off the rays of light. Figure 1 shows the main switch set in a position allowing the film 2 to pass through the projector in a normal manner.

It will also be seen that there has been provided a manual means for releasing the latch 31 consisting of a button 56 manipulating a plunger 57 which is normally under spring control by means of a coil spring 58 which holds a lower end 59 free from the metallic end 49 of the pivoted latch member 50. It will also be seen that when the pin 30 is brought back to a latched position functioning with the latch 31 certain positive movements must be made in bringing it back. First, the pin 30 riding out of a cam 60 forces the switch blade 52 into a closed position closing the switch 54 and as it swings upwardly the pin comes in contact with a depended cam 61 formed on the pivoted latch member 50 thereby producing a movement making the contact of pin 30 with the latch 31 positive as to latching contact.

By referring to Figures 1, 2, 3, 4, 5, and 6 it will be seen that before driving motor may be started the extended handle member 24 and the pivoted hand grip member 25 must be compressed together to release the catch 27 and the catch seat 28. This allows the collar 21 to slidably rotate on the extended shaft end 18 at the central opening 23 and when the cam 22 contacts with the cam 20 the rotatable shaft 15 will rotate causing the pin 30 to quickly close the switch blade 52 with only a slight movement of the rotatable shaft 15 and the manipulating arm 29. This action starts driving motor without raising the douser 13 on the douser arm 16 out of light rays.

In operating practice it is necessary to start the projection motor before permitting light rays to penetrate the film. When it is time to let the light rays from the arc lamp pass through the film the douser arm 16 may be moved to operating position. To do this will cause the pin 30 to engage with the latch 31. It is obvious that when the pin 31 is released from a latched position the tension of the spring 32 not only opens the switch 54 but also rotates the shaft 15 carrying the douser 13 into a closed position, thereby shutting off the arc light from contact with the film 2. It is evident that the douser arm 16 with douser 13 may be manually moved to cut off the light rays at any time desired without stopping the driving motor.

In the event of film trouble or when the tail end of the film passes through the projector, contact will be made at any or all of the film switches 37, 42, and 47 which will cause the pin 30 to be released at the catch 31 automatically stopping the drive motor and releasing the douser 13 cutting the light rays off.

It will also be seen that the extended handle member 24 and the douser arm 16 are free to move on the extended shaft end 18 while the pin 30 is engaged at the latch 31 without stopping the drive motor. This is necessary because in operating practice the light must, at the outgoing projector, be cut off at the same instant that it is put on at the incoming projector and the outgoing projector must continue to run until the tail end of the film has completely run through.

It is also evident that whether the douser 13 is in operating or closed position when the tail end of the film passes through the projector the film switches 37, 42, and 47 will function causing the drive motor to stop.

By referring to the drawings it will be seen that there is provided a motor starting handle 62 which is keyed to the outer extended shaft end 18. This motor starting handle 62 is provided with an opposite member consisting of an inturned arm 63 for the purpose of rotating the douser arm 16 and connecting parts. The purpose of the motor starting handle 62 is to provide a further means of closing the main switch 54 by a slight rotation of the rotatable shaft 15 without causing the douser 13 to be swung out of the path of the light rays coming from the light aperture 12. It is also evident that by means of the motor starting handle 62 the rotatable shaft 15 may be rotated further in order to place the pin 30 in a latched position with the latch 31.

What we claim is:—

In a device of the class described comprising a projector and a plurality of switches functioning with a film passing through said projector, in combination with a switch for the purpose of controlling a motor and driving the projector, each of said plurality of switches controlling an electric magnet, a rotatable shaft, a manipulating arm secured to said rotatable shaft, a pin secured to said manipulating arm, a douser arm functioning with said rotatable shaft, a douser secured to said douser arm, a pivoted latch member functioning with said pin, a metallic end of said pivoted latch member functioning with said magnet, a spring holding said manipulating arm under tension.

ARCHIE E. IRONS.
DARRELL S. KEPLER.